United States Patent [19]

Steckel

[11] 4,430,961
[45] Feb. 14, 1984

[54] INSECTICIDE IMPREGNATED TAG FOR USE ON AN ANIMAL'S TAIL OR LEG

[76] Inventor: Lester M. Steckel, Box 235, Taylor, Nebr. 68879

[21] Appl. No.: 408,474

[22] Filed: Aug. 16, 1982

[51] Int. Cl.³ ............... A01K 13/00; A01K 29/00
[52] U.S. Cl. ................................. 119/156; 40/301
[58] Field of Search .............. 119/156, 157, 106; 40/300, 301, 302

[56] References Cited

U.S. PATENT DOCUMENTS

| | | | |
|---|---|---|---|
| 1,956,276 | 4/1934 | Cook | 119/156 X |
| 2,306,076 | 12/1942 | Mullen | 119/157 |
| 2,900,696 | 8/1959 | Bacon | 119/106 X |
| 3,756,200 | 9/1973 | Ohlhausen | 119/156 |
| 3,935,839 | 2/1976 | Goodwin | 119/156 |
| 3,942,480 | 3/1976 | Hair et al. | 119/156 |
| 3,949,708 | 4/1976 | Meeks | 119/156 |
| 4,023,532 | 5/1977 | Goodwin | 119/156 |
| 4,031,859 | 6/1977 | Stewart | 119/106 |
| 4,059,074 | 11/1977 | Fürer et al. | 119/156 |
| 4,184,453 | 6/1980 | Ritchey | 119/156 |
| 4,195,075 | 3/1980 | Miller | 424/14 |
| 4,218,991 | 8/1980 | Cole | 119/106 |

FOREIGN PATENT DOCUMENTS 2331283 1/1975 Fed. Rep. of Germany ...... 119/156

OTHER PUBLICATIONS

Y-Tex Gard Star TM Insecticide Ear Tags.

*Primary Examiner*—Hugh R. Chamblee
*Attorney, Agent, or Firm*—Zarley, McKee, Thomte, Voorhees & Sease

[57] ABSTRACT

An insecticide impregnated tag is described which may be used on either the animal's tail or leg to control files, grubs, etc. The tag comprises a flat flexible member which is impregnated with the insecticide and which has a flexible strap secured thereto. The strap is adapted to be wrapped around and secured to the animal's tail or leg. When the tag is attached to the animal's tail, the whipping of the tail by the animal will control insects on the animal's hindquarters, rump and back. When the tag is attached to the animal's leg adjacent the hoof, the insecticide in the tag will control those insects normally found in the area adjacent the animal's hooves.

3 Claims, 4 Drawing Figures

INSECTICIDE IMPREGNATED TAG FOR USE ON AN ANIMAL'S TAIL OR LEG

BACKGROUND OF THE INVENTION

The control of insects on cattle and horses has constantly posed a problem to the rancher. Many types of insecticide applicators, such as insecticide impregnated ear tags, have been provided and have been found to be generally satisfactory except that they are quite expensive. The insecticide impregnated ear tags control the insects normally present around the animal's face, such as face flies, horn flies, etc. However, the insecticide impregnated ear tag gives very little protection to the animal except for the area around the animal's face and do not control insects, grubs, worms, etc. present near the animal's hooves.

Therefore, it is a principal object of the invention to provide an insecticide impregnated tag for use with animals such as cattle or horses.

A further object of the invention is to provide an insecticide impregnated tag which may be secured to an animal's tail or leg.

A further object of the invention is to provide an insecticide impregnated tag for use with an animal including means for preventing the inadvertent removal therefrom.

Still another object of the invention is to provide an insecticide impregnated tag which may be easily secured to or removed from the animal.

A further object of the invention is to provide a tail tag for cattle and horses which will provide insect control as the animal whips or brushes its tail.

Still another object of the invention is to provide a tag for use with an animal's leg which may be positioned closely adjacent the hoof area to control those insects normally associated with the animal's hooves.

Still another object of the invention is to provide an insecticide impregnated tag which is economical of manufacture, durable in use and refined in appearance.

SUMMARY OF THE INVENTION

Figure 1:
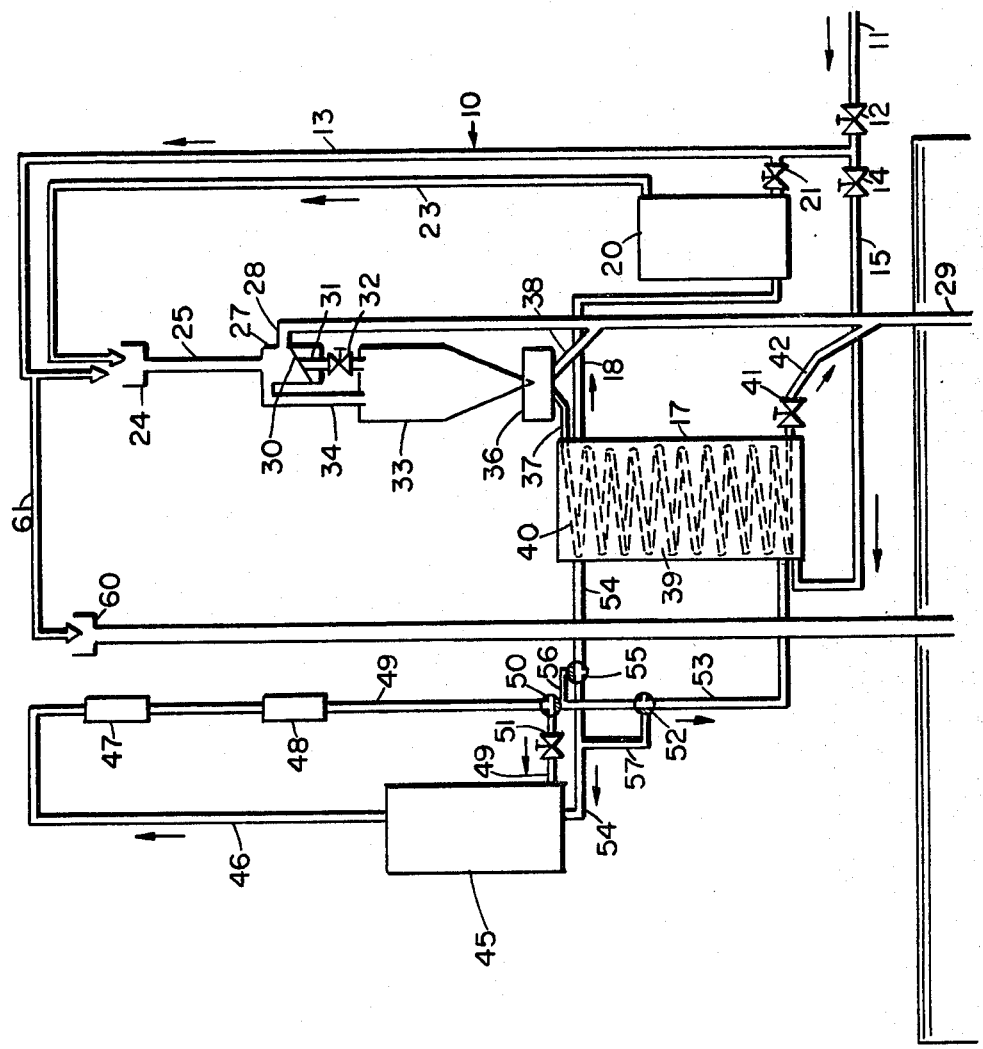
FIG. 1 is a rear perspective view of the hind portion of an animal having the tag of this invention secured to its tail and to its leg.

An insecticide impregnated tag is described which may be used on an animal's leg or tail. The tag comprises a flat flexible member which is impregnated with insecticide and which has a strap secured thereto which may be wrapped around and secured to the animal's tail or leg. When the animal brushes or whips its tail, the insecticide in the flat flexible member will control the insects around the animal's hind quarters, rump and back. When the tag is secured to the animal's leg, the insecticide in the flat flexible member will control those insects normally found around the animal's hooves.

DESCRIPTION OF THE PREFERRED EMBODIMENT

The tag of this invention is referred to generally by the reference numeral 10 and is adapted to be secured to the tail 12 or leg 14 of the animal 16.

Tag 10 comprises a flat flexible member 18 comprised of a suitable plastic material. Member 18 comprises an outer surface 20, inner surface 22, opposite sides 24 and 26, and opposite ends 28 and 30. As seen in the drawings, member 18 is provided with rectangular shaped openings 32 and 34 spaced inwardly from ends 28 and 30 respectively. Member 18 is provided with a plurality of upstanding connector pegs or posts 36 having enlarged head portions 38 thereon.

The numeral 40 refers to an elongated flexible strap including ends 42 and 44. Strap 40 is provided with a plurality of spaced apart connector pegs or posts 46 having enlarged head portions 48. As seen in the drawings, the connector posts 46 are positioned adjacent end 42. A plurality of openings 50 are formed in strap 40 adjacent end 44 which are adapted to receive the connector posts or pins 46.

Figure 4:
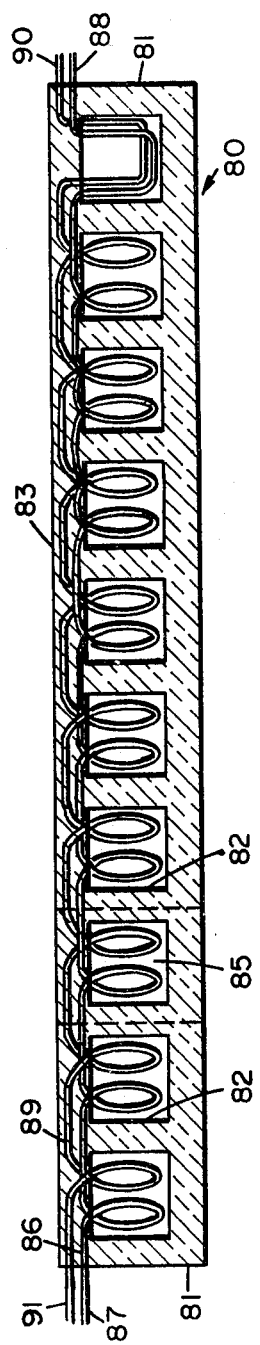
FIG. 4 is a sectional view seen on lines 3—3 of FIG. 3.
Figure 5:
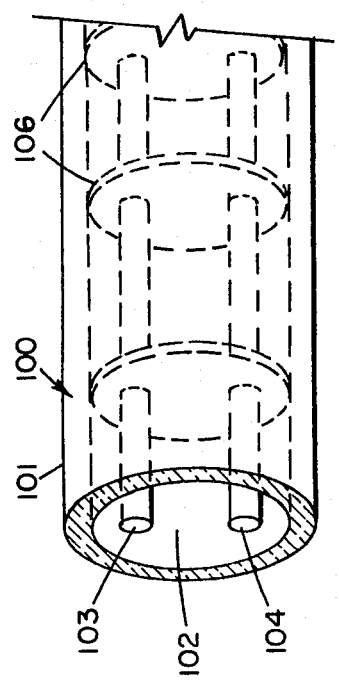

Strap 40 is also provided with a plurality of openings 52 formed therein at the approximate center length thereof which are adapted to receive the connector pins or posts 36. As seen in FIG. 4, strap 40 extends upwardly through opening 42, across outer surface 20 and downwardly through opening 34. The connector pins on the member 18 and strap 40 are of conventional design and are of the type normally found in the adjustment straps of caps or the like. The strap 40 is comprised of a suitable plastic material so that it is flexible to permit it to be wrapped around the tail 12 or leg 14. The member 18 is impregnated with insecticide in conventional fashion. The preferred insecticide is comprised

| INGREDIENTS: | |
|---|---|
| Permethrin | 10.0% |
| (3-phenoxyphenyl) methyl(±)cis, trans-3-(2-dichloroethenyl)-2,2-dimethylcyclopropane-carboxylate* | |
| INERT INGREDIENTS | 90.0% |
| | 100.0% |

*cis/trans ratio: 25% cis and 75% trans

Figure 2:
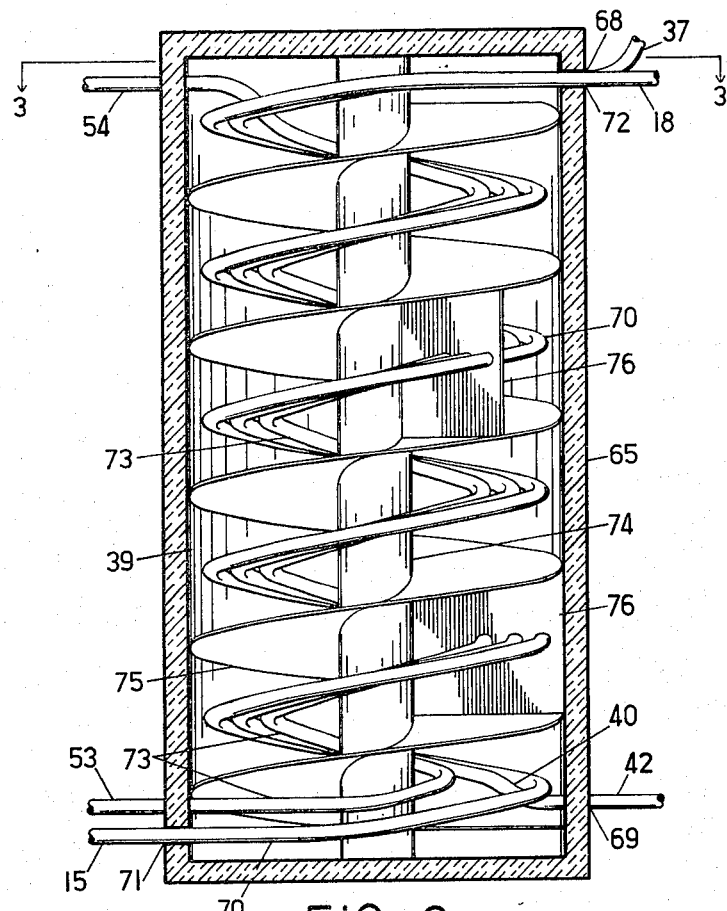
FIG. 2 is a top view of the tag as seen on lines 2—2 of FIG. 1.
Figure 3:
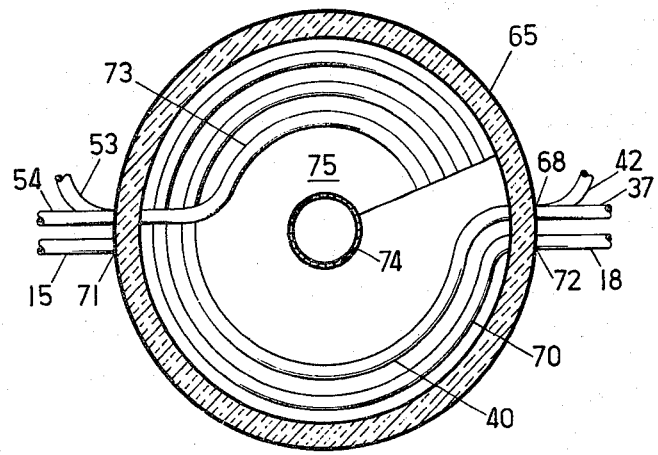
FIG. 3 is an elevational view of the tag in its flat position.

Although the above identified insecticide is the preferred insecticide, other types of insecticides commonly available to the industry may be employed. In use, the strap 40 is secured to the flat member 18 as previously described. The tag is positioned adjacent the animal's leg or tail so that surface 22 braces the leg or tail. Strap 40 is then extended around the tail or leg with the connector pins or posts being extended through the openings 50 to maintain the tag on the animal. As seen in FIGS. 2 and 4, ends 42 and 44 are tapered at 54 and 56 so that a smooth surface is provided to avoid irritation to the animal and to eliminate any objectionable protruding surfaces which could result in the inadvertent removal of the tag from the animal.

Thus, when the tag 10 is secured to the animal's tail, the whipping or brushing of the tail by the animal will permit the insecticide in the member 18 to control the insects adjacent the animal's rump, hindquarters and back. When the tag 10 is secured to the animal's leg as seen in FIG. 1, the insecticide in the member 18 will control those insects normally found adjacent the animal's hooves. When the insecticide in member 18 has lost its potency, the tag may be easily removed and a new member 18 secured to the strap 40 thus eliminating the need for the replacement of a complete strap.

Thus it can be seen that the insecticide impregnated tag of this invention accomplishes at least all of its stated objectives.

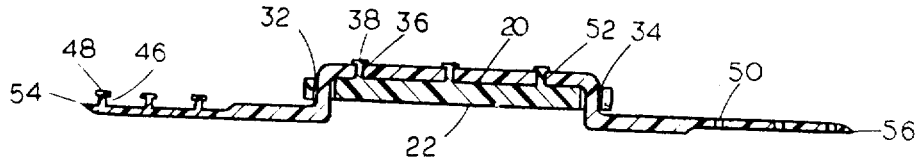

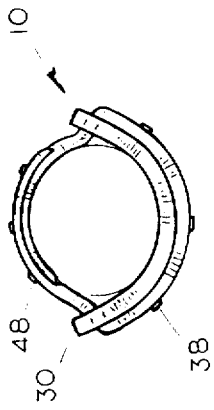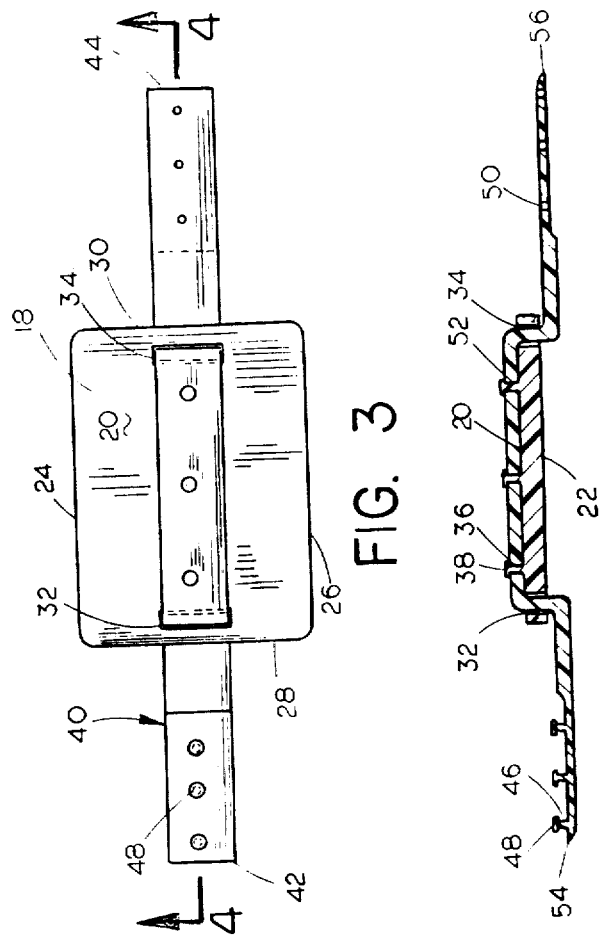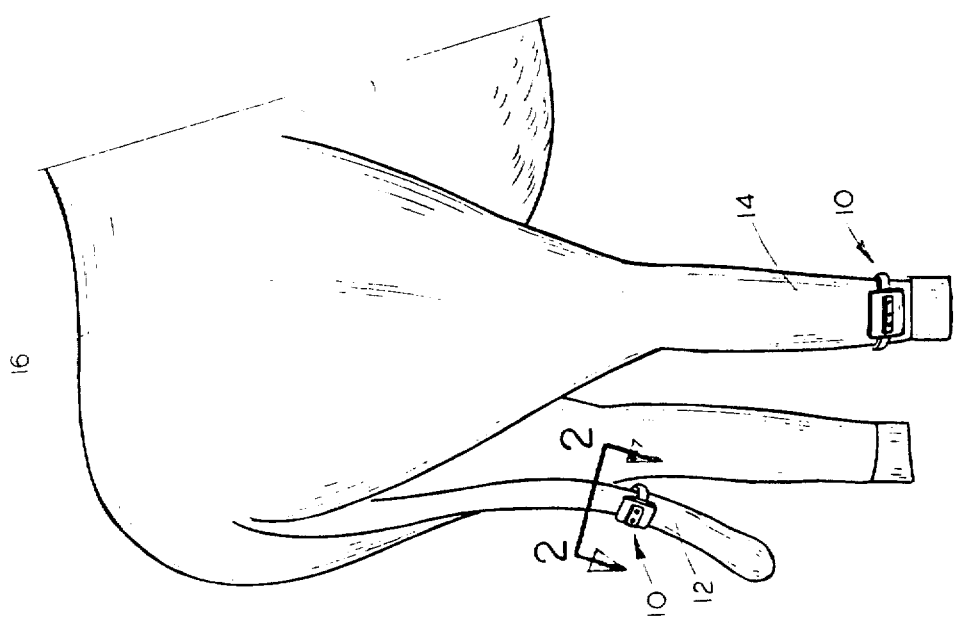

I claim:

1. A tag for an animal's tail, comprising,
 a flat, flexible member impregnated with insecticide, and a strap means secured to said flat member adapted to be wrapped around and secured to the animal's tail,
 said flat member having opposite sides and ends, said flat member having a plurality of spaced-apart openings formed therein, said strap means having a plurality of spaced-apart pegs thereon which detachably receive said openings.

2. The tag of claim 1 wherein said flat member has a first elongated opening adjacent one end thereof and a second elongated opening adjacent the other end thereof, said strap means extending through said first opening, thence over one side of said flat member, thence through said second opening.

3. A tag for an animal's leg, comprising,
 a flat, flexible member impregnated with insecticide, and a strap means secured to said flat member adapted to be wrapped around and secured to the animal's leg,
 said flat member having a plurality of spaced-apart openings formed therein, said strap means having a plurality of spaced-apart pegs thereon which detachably receive said openings.

* * * * *

UNITED STATES PATENT AND TRADEMARK OFFICE
CERTIFICATE OF CORRECTION

PATENT NO. : 4,430,961

DATED : February 14, 1984

INVENTOR(S) : Lester M. Steckel

Page 1 of 3

It is certified that error appears in the above-identified patent and that said Letters Patent is hereby corrected as shown below:

The title page should be deleted to appear as per attached title page.

The sheet of drawings consisting of Figs. 1-4 should be deleted and the attached sheet of drawings containing Figs. 1-4 substituted therefor.

Signed and Sealed this

Twenty-second Day of May 1984

[SEAL]

Attest:

Attesting Officer

GERALD J. MOSSINGHOFF

Commissioner of Patents and Trademarks

United States Patent [19]

Steckel

[11] 4,430,961

[45] Feb. 14, 1984

[54] INSECTICIDE IMPREGNATED TAG FOR USE ON AN ANIMAL'S TAIL OR LEG

[76] Inventor: Lester M. Steckel, Box 235, Taylor, Nebr. 68879

[21] Appl. No.: 408,474

[22] Filed: Aug. 16, 1982

[51] Int. Cl.³ ................... A01K 13/00; A01K 29/00
[52] U.S. Cl. ............................. 119/156; 40/301
[58] Field of Search ............ 119/156, 157, 106; 40/300, 301, 302

[56] References Cited

U.S. PATENT DOCUMENTS

| | | | |
|---|---|---|---|
| 1,956,276 | 4/1934 | Cook | 119/156 X |
| 2,306,076 | 12/1942 | Mullen | 119/157 |
| 2,900,696 | 8/1959 | Bacon | 119/106 X |
| 3,756,200 | 9/1973 | Ohlhausen | 119/156 |
| 3,935,839 | 2/1976 | Goodwin | 119/156 |
| 3,942,480 | 3/1976 | Hair et al. | 119/156 |
| 3,949,708 | 4/1976 | Meeks | 119/156 |
| 4,023,532 | 5/1977 | Goodwin | 119/156 |
| 4,031,859 | 6/1977 | Stewart | 119/106 |
| 4,059,074 | 11/1977 | Fürer et al. | 119/156 |
| 4,184,453 | 6/1980 | Ritchey | 119/156 |
| 4,195,075 | 3/1980 | Miller | 424/14 |
| 4,218,991 | 8/1980 | Cole | 119/106 |

FOREIGN PATENT DOCUMENTS 2331283 1/1975 Fed. Rep. of Germany ...... 119/156

OTHER PUBLICATIONS

Y-Tex Gard Star ™ Insecticide Ear Tags.

Primary Examiner—Hugh R. Chamblee
Attorney, Agent, or Firm—Zarley, McKee, Thomte, Voorhees & Sease

[57] ABSTRACT

An insecticide impregnated tag is described which may be used on either the animal's tail or leg to control files, grubs, etc. The tag comprises a flat flexible member which is impregnated with the insecticide and which has a flexible strap secured thereto. The strap is adapted to be wrapped around and secured to the animal's tail or leg. When the tag is attached to the animal's tail, the whipping of the tail by the animal will control insects on the animal's hindquarters, rump and back. When the tag is attached to the animal's leg adjacent the hoof, the insecticide in the tag will control those insects normally found in the area adjacent the animal's hooves.

3 Claims, 4 Drawing Figures